(12) United States Patent
Hunskor et al.

(10) Patent No.: US 8,863,348 B2
(45) Date of Patent: Oct. 21, 2014

(54) HANDHELD PLUMBOB CLEANER

(76) Inventors: Darwin G. Hunskor, Newburg, ND (US); Judith Y. Hunskor, Newburg, ND (US)

( * ) Notice: Subject to any disclaimer, the term of this patent is extended or adjusted under 35 U.S.C. 154(b) by 248 days.

(21) Appl. No.: 13/493,289

(22) Filed: Jun. 11, 2012

(65) Prior Publication Data

US 2013/0326835 A1 Dec. 12, 2013

(51) Int. Cl.
*G01F 23/04* (2006.01)
(52) U.S. Cl.
CPC ..................................... *G01F 23/045* (2013.01)
USPC ........................... 15/220.4; 15/245; 15/104.04
(58) Field of Classification Search
CPC ................................................... G01F 23/045
USPC .......................... 15/245, 104.04, 220.4, 210.1
See application file for complete search history.

(56) References Cited

U.S. PATENT DOCUMENTS

| | | | |
|---|---|---|---|
| 2,157,024 A | 5/1939 | Smith | |
| 2,391,980 A * | 1/1946 | Knapp | 118/268 |
| 4,017,935 A | 4/1977 | Hernandez | |
| 4,233,704 A | 11/1980 | Sartorio | |
| 4,282,624 A * | 8/1981 | Cobb | 15/220.4 |
| 4,716,615 A | 1/1988 | Whitehead | |
| 4,891,859 A | 1/1990 | Tremblay | |
| 5,598,602 A | 2/1997 | Gibson | |
| 6,584,639 B1 | 7/2003 | Snyder | |
| 7,730,573 B1 * | 6/2010 | Snyder | 15/220.4 |

* cited by examiner

*Primary Examiner* — Shay Karls
(74) *Attorney, Agent, or Firm* — Jason L. Gilbert (57) ABSTRACT

A handheld plumbob cleaner for efficiently cleaning a plumbob after measuring fluid in a storage tank. The handheld plumbob cleaner generally includes a frame portion, a handle portion extending from the frame portion and a cleaner attachment secured to the frame portion. The frame portion includes a slot leading to a central opening and a plurality of fastener apertures positioned around its outer perimeter. The cleaner attachment similarly includes a slot leading to a smaller central opening and corresponding fastener apertures around its outer perimeter. The cleaner attachment is secured to the frame portion via one or more fasteners. The gauge tape of the plumbob may then be inserted within the slots and the plumbob pulled up through the central opening to squeegee oily residue therefrom.

18 Claims, 7 Drawing Sheets

HANDHELD PLUMBOB CLEANER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a plumbob cleaner and more specifically it relates to a handheld plumbob cleaner for efficiently cleaning a plumbob after measuring fluid in a storage tank.

2. Description of the Related Art

Any discussion of the related art throughout the specification should in no way be considered as an admission that such related art is widely known or forms part of common general knowledge in the field.

Plumbobs have been in use for many years in measuring the amount of a substance such as oil within an oil storage tank. After extraction of the plumbob from an oil storage tank, it is often covered in oily residue, which can stain clothing or create a health hazard if not properly cleaned.

In the past, tools such as rags and other devices have been used to clean such plumbobs after use. Thus use of such rags can, in practice, actually create more of a mess and hazard when the rags are not properly handled or disposed of. Further, even the use of a rag does not always prevent oily residue from covering the hands of an operator thereof. U.S. Pat. No. 7,730,573, covering a "Convertible Fuel Squeegee", discloses one such tool for cleaning a plumbob or dipstick. However, the '573 reference discloses use of a foot-operated cleaner which appears to be awkward and inefficient to operate.

Because of the inherent problems with the related art, there is a need for a new and improved handheld plumbob cleaner for efficiently cleaning a plumbob after measuring fluid in a storage tank.

BRIEF SUMMARY OF THE INVENTION

The invention generally relates to a handheld plumbob cleaner which includes a frame portion, a handle portion extending from the frame portion and a cleaner attachment secured to the frame portion. The frame portion includes a slot leading to a central opening and a plurality of fastener apertures positioned around its outer perimeter. The cleaner attachment similarly includes a slot leading to a smaller central opening and corresponding fastener apertures around its outer perimeter. The cleaner attachment is secured to the frame portion via one or more fasteners. The gauge tape of the plumbob may then be inserted within the slots and the plumbob pulled up through the central opening to squeegee oily residue therefrom.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 7 illustrate a handheld plumbob cleaner 10, which comprises a frame portion 20, a handle portion 30 extending from the frame portion 20 and a cleaner attachment 50 secured to the frame portion 20. The frame portion 20 includes a slot 23 leading to a central opening 26 and a plurality of fastener apertures 28 positioned around its outer perimeter. The cleaner attachment 50 similarly includes a slot 23 leading to a smaller central opening 56 and corresponding fastener apertures 58 around its outer perimeter. The cleaner attachment 50 is secured to the frame portion 20 via one or more fasteners 12. The gauge tape 15 of the plumbob 14 may then be inserted within the slots 28, 58 and the plumbob 14 pulled up through the central opening 56 to squeegee oily residue therefrom.

B. Frame Portion.

Figure 1:
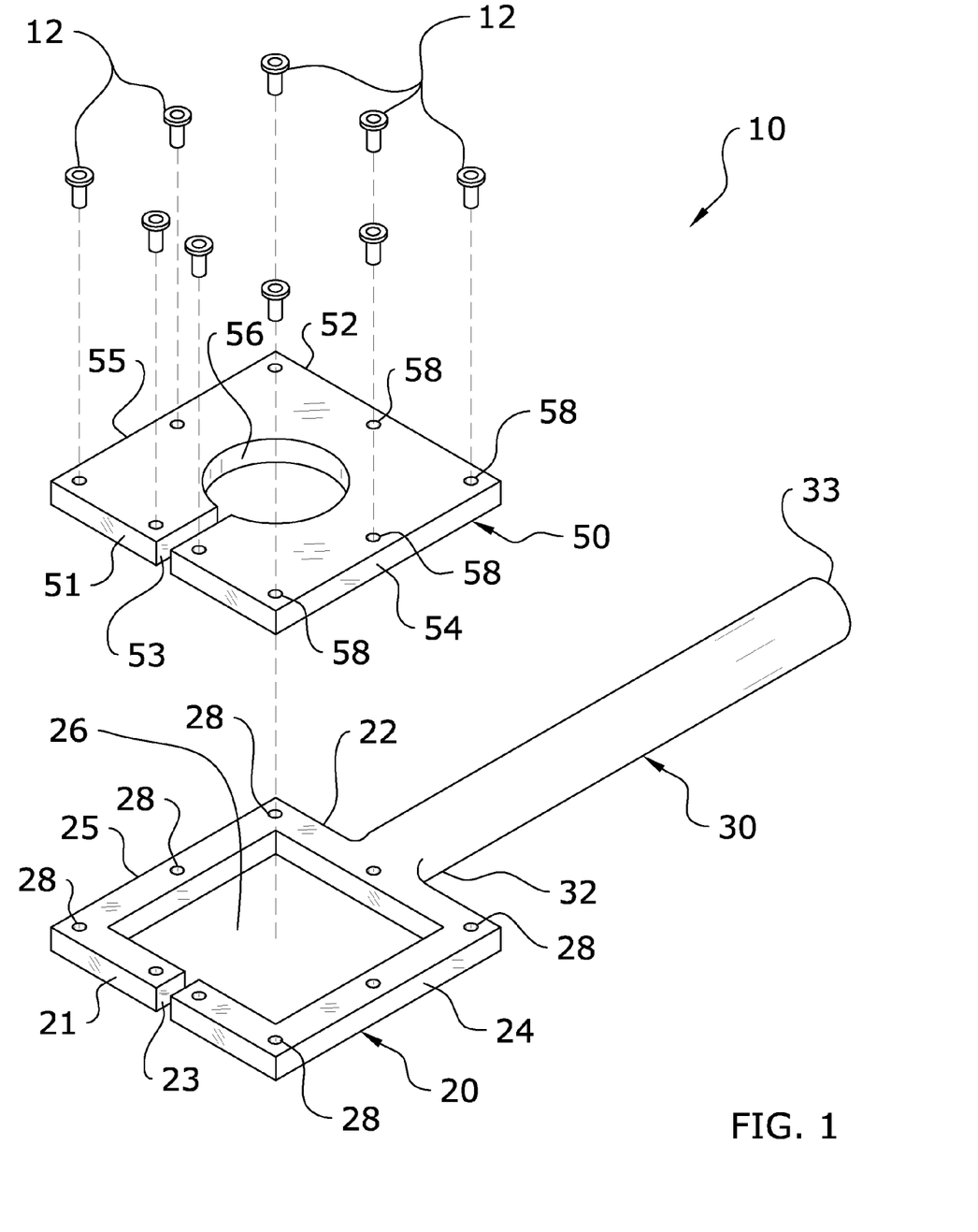
FIG. 1 is an upper perspective exploded view of the present invention.

As shown in FIG. 1, the present invention includes a frame portion 20 from which the handle portion 30 extends and to which the cleaning attachment 40 is fixedly or removably secured. The frame portion 20 is preferably comprised of a square- or rectangular-shaped configuration as shown in the figures, though it is appreciated that other shapes may be utilized. Thus, the shape and configuration of the frame portion 20 should not be construed as being limited by the exemplary figures.

Figure 2:
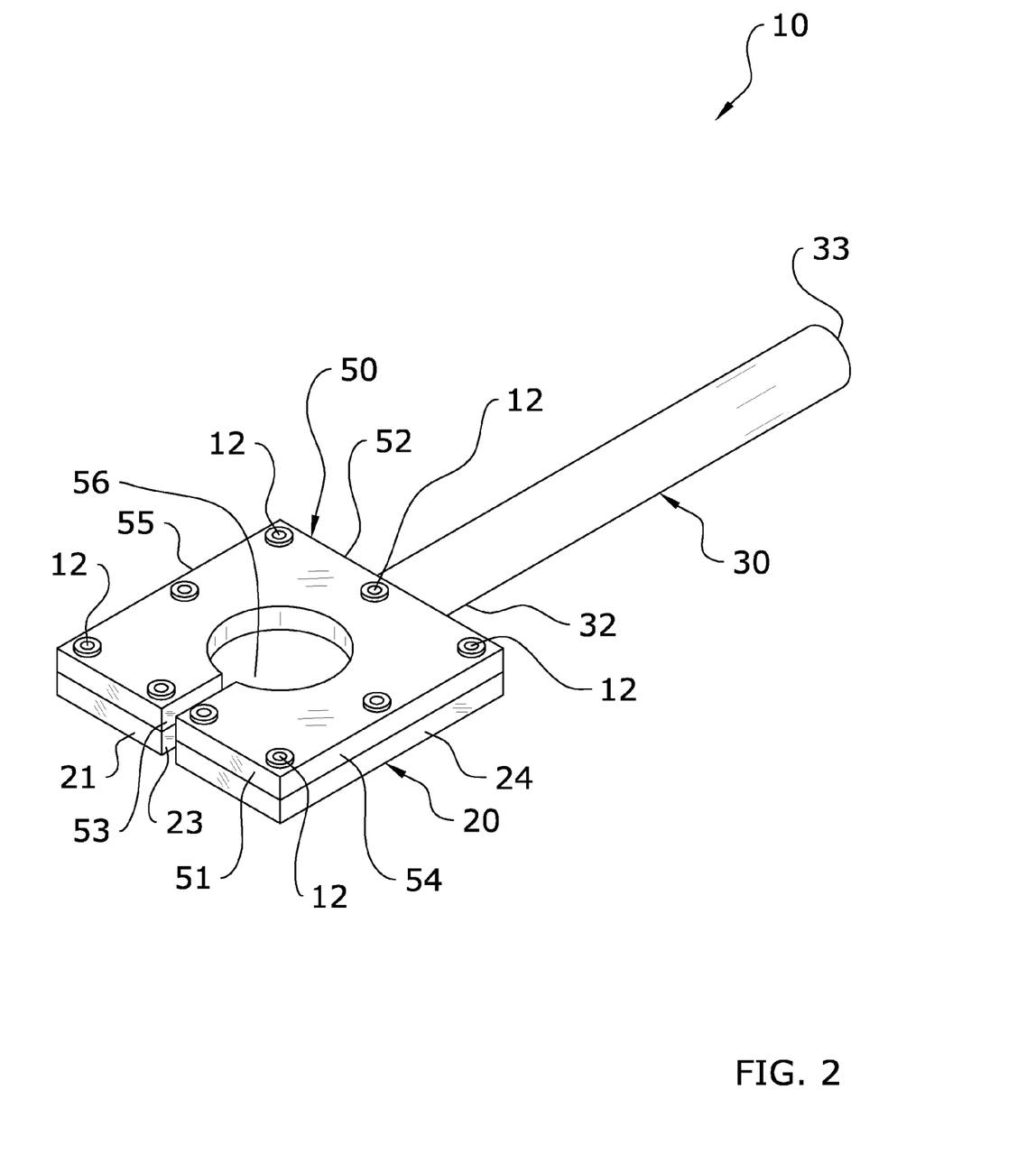
FIG. 2 is an upper perspective view of the present invention.
Figure 3:
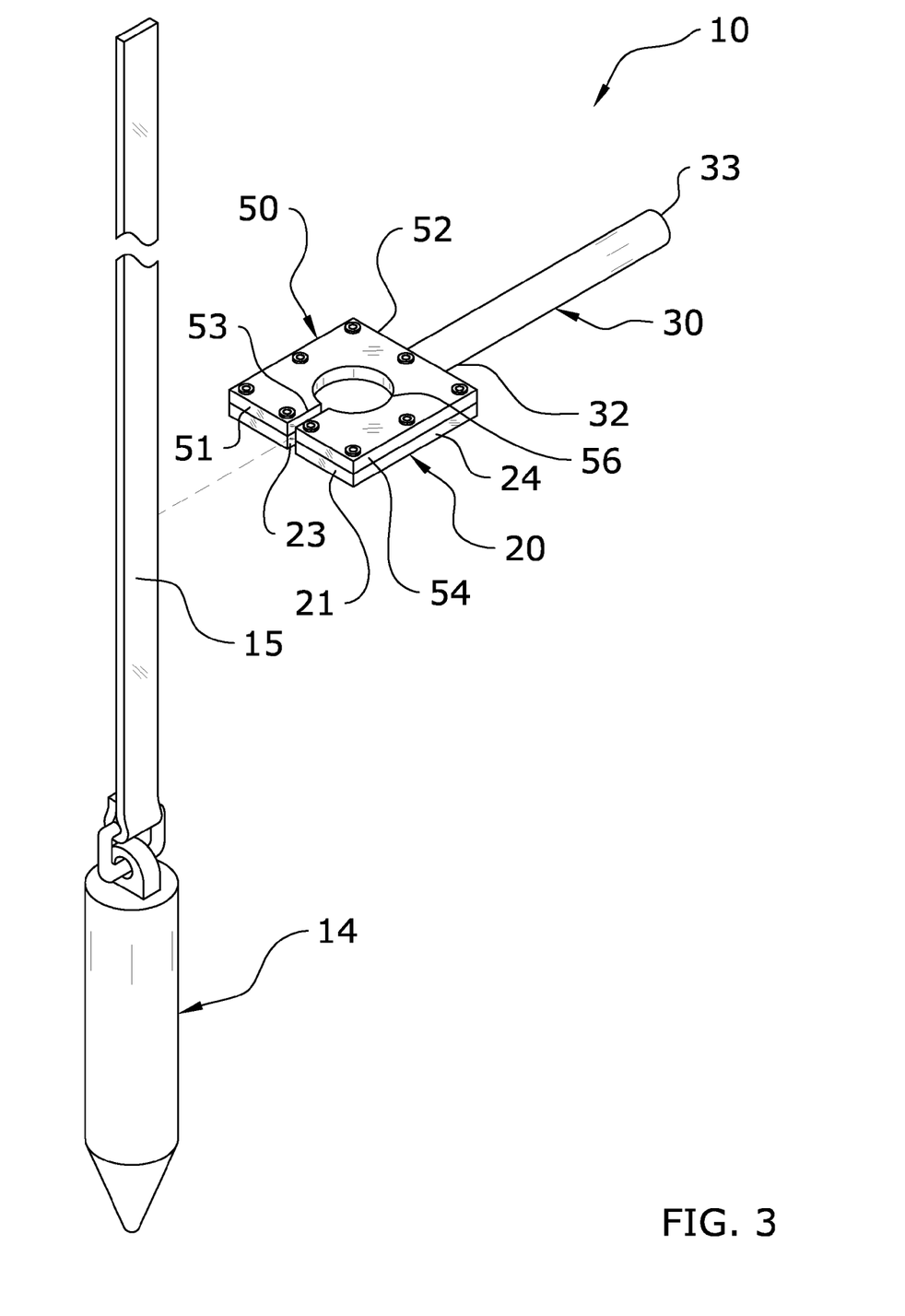
FIG. 3 is an upper perspective view illustrating usage of the present invention.
Figure 4:
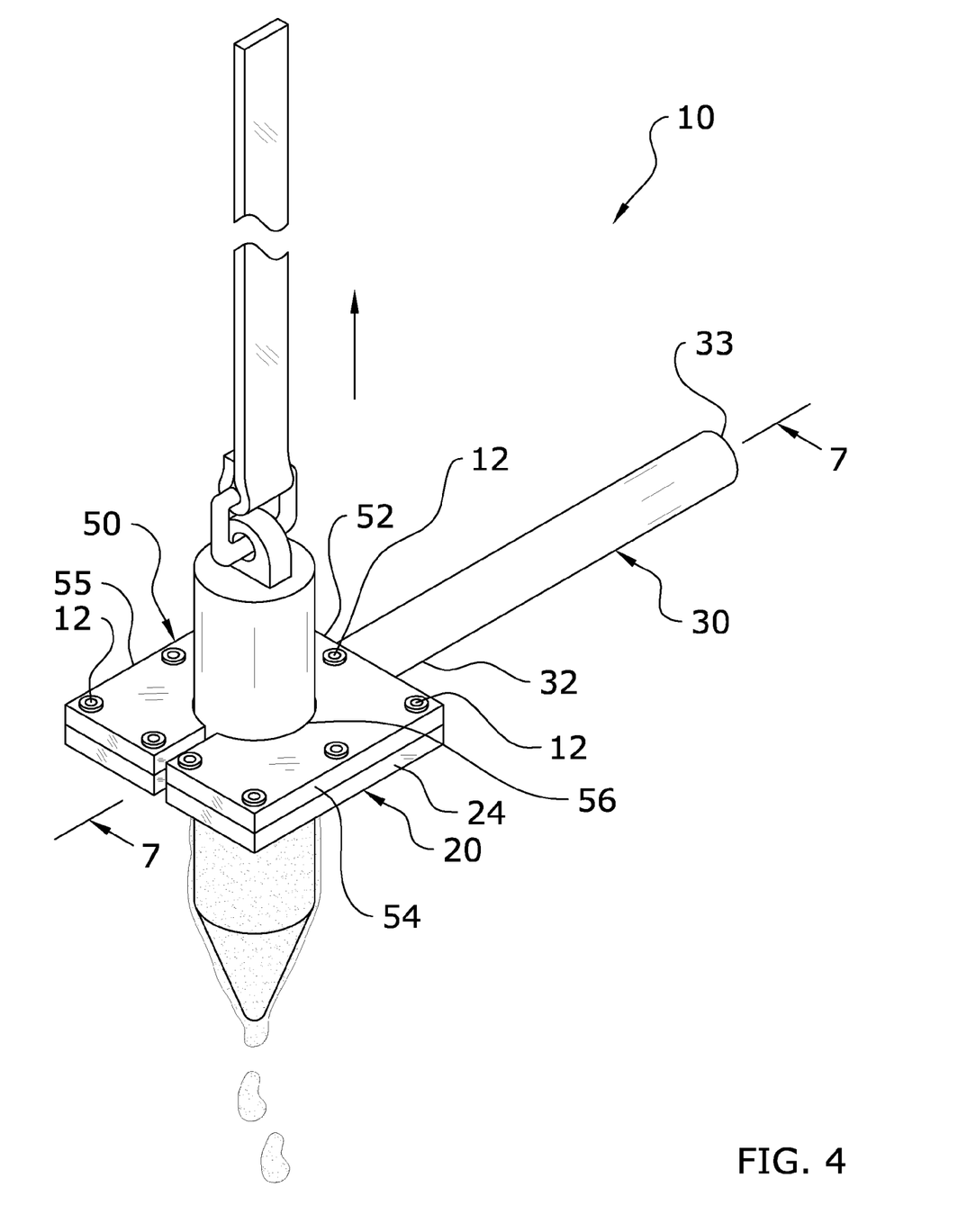
FIG. 4 is an upper perspective view illustrating usage of the present invention to clean a plumbob.
Figure 5:
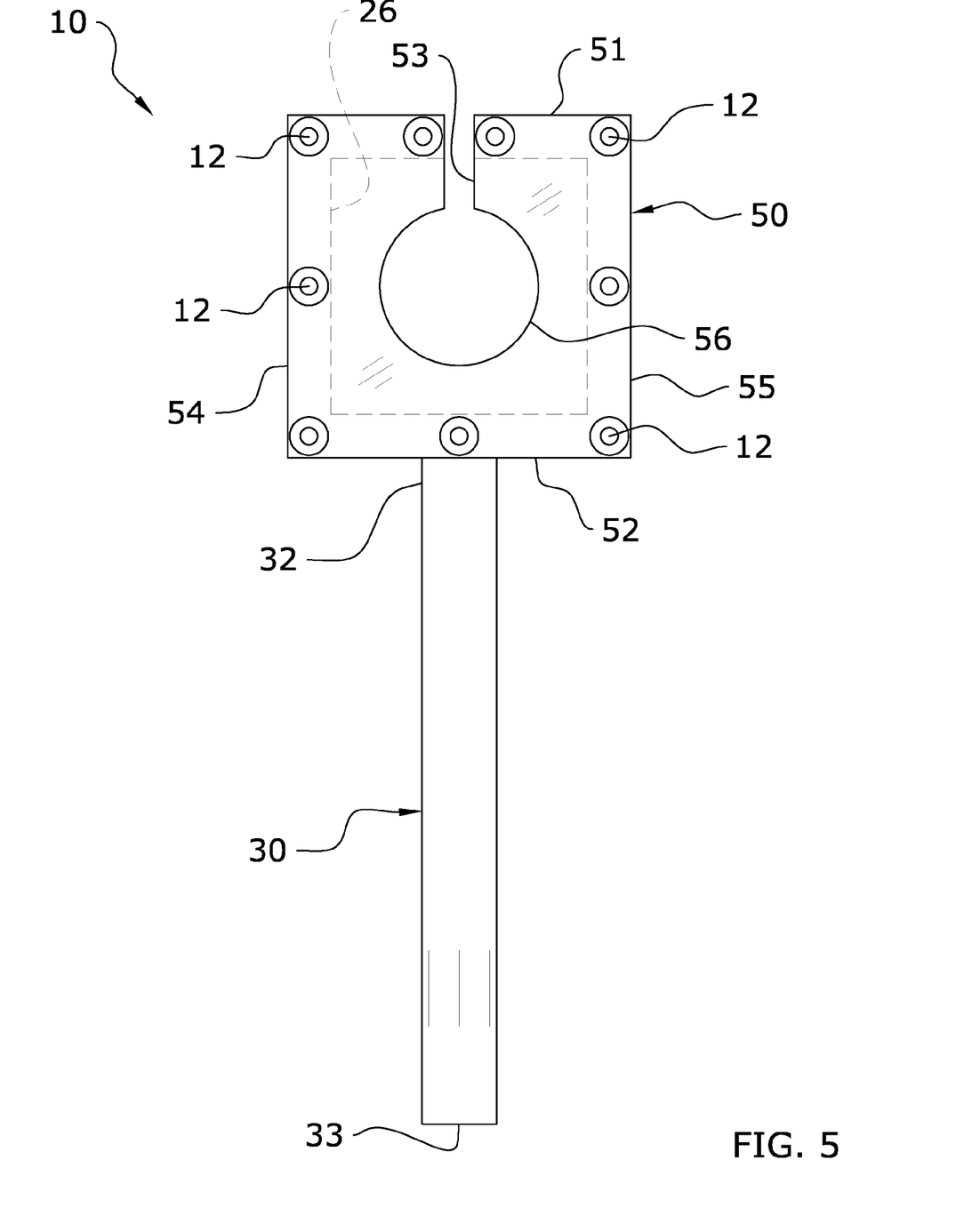
FIG. 5 is a top view of the present invention.
Figure 6:
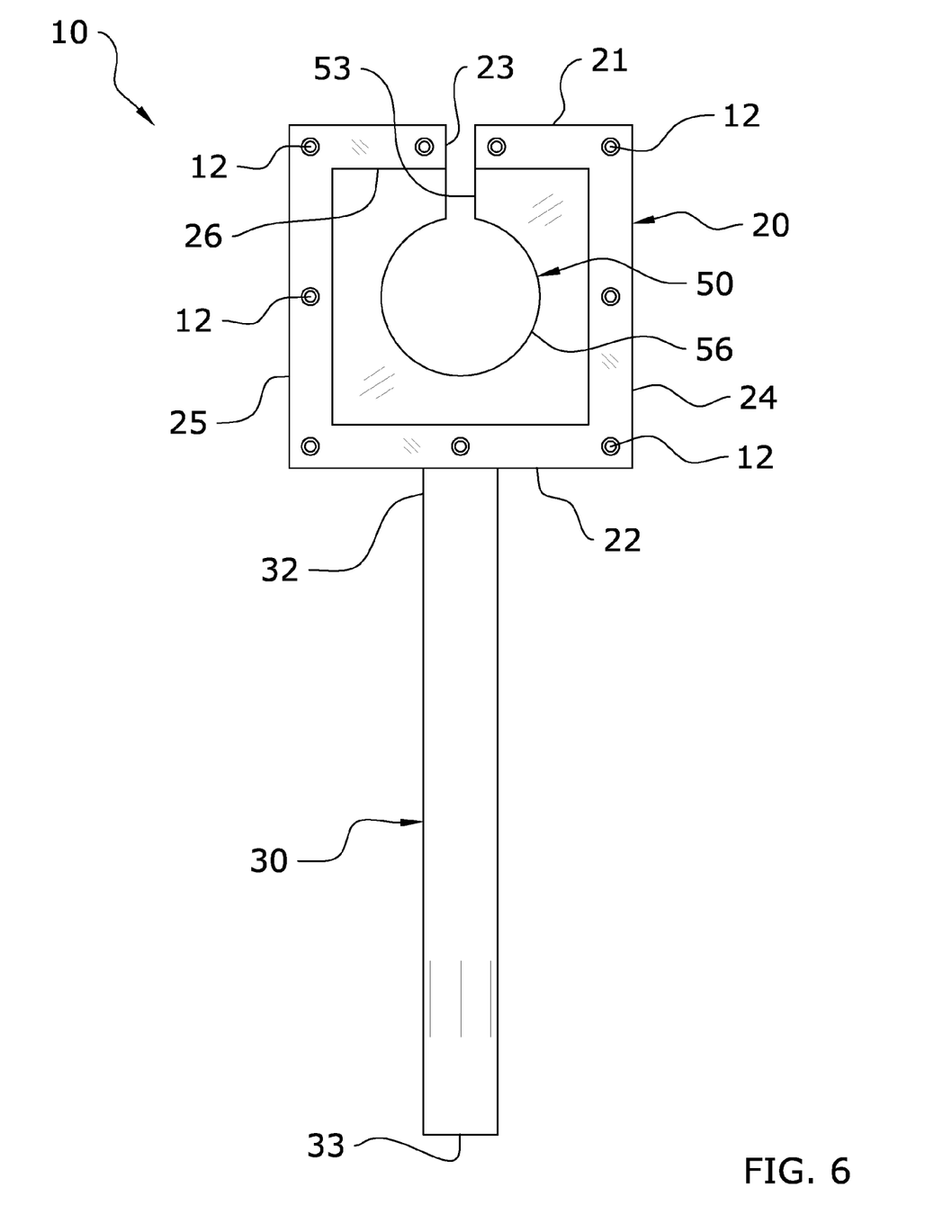
FIG. 6 is a bottom view of the present invention.

The frame portion 20 includes a front end 21 and a rear end 22 as shown in FIG. 2. The front end 21 of the frame portion 20 includes a slot 23 which extends in a rearward direction from a central point between the frame portion's 20 first and second sides 24, 25 as shown in FIG. 1. It is appreciated, however, that the slot 23 may be positioned at other locations on the front end 21 of the frame portion 20 for different applications.

The slot 23 leads to a central opening 26 which is formed in the central portion of the frame portion 20 as shown in FIG. 1. The central opening 26 may be comprised of a rectangular- or square-shaped opening 26 as shown in FIG. 1, or it may be comprised of other configurations. The central opening 26 of the frame portion 20 will preferably be larger than the central opening 56 of the cleaner attachment 50, though other configurations may be utilized for different embodiments.

The frame portion 20 will preferably include one or more fastening apertures 28 positioned around its outer perimeter as shown in FIG. 1. Preferably, fastening apertures 28 will be positioned on the front end 21, rear end 22, first side 24 and second side 25 of the frame portion 20 to ensure that the cleaner attachment 50 may be firmly secured to the frame portion 20 when the present invention is in use.

Each of the fastening apertures 28 is preferably comprised of an aperture extending through the frame portion 20 which is adapted to receive and engage with a fastener 12 such as a rivet. The numbering and positioning of the fastening apertures 28 should not be construed as being limited by the exemplary figures. As appreciated by one skilled in the art, such positioning and numbering may vary for different embodiments of the present invention.

C. Handle Portion.

As shown in the figures, the present invention includes a handle portion 30 which may be gripped by the operator of the present invention when in use. By including a handle portion 30, the present invention accommodates handheld use and thus substantially increases efficiency of the handheld plumbob cleaner 10 when used to clean a plumbob 14, dipstick or similar device.

The handle portion 30 will generally be comprised of an elongated member, wherein a proximate end 32 of the handle portion 30 extends from the rear end 22 of the frame portion 20. The distal end 33 of the handle portion 30 is gripped by an operator of the present invention when it is in use. Various other handle configurations may be utilized. In some embodiments, the handle portion 30 and frame portion 20 will be integrally formed of a unitary structure.

D. Cleaning Attachment.

The present invention includes a cleaning attachment 50 which is secured to the frame portion 20. The cleaning attachment 50 acts to squeegee the oil residue off the plumbob 14 or similar device which is being cleaned. The cleaning attachment 50 is preferably comprised of a similar shape and size as the frame portion 20 of the present invention as shown in the figures.

In a preferred embodiment, the cleaner attachment 50 is comprised of a rectangular- or square-shaped structure having a front end 51 and a rear end 52. The front end 51 of the cleaner attachment 50 includes a slot 53 which extends in a rearward direction from a central point between the cleaner attachment's 50 first and second sides 54, 55 as shown in FIG. 1. It is appreciated, however, that the slot 53 may be positioned at other locations on the front end 51 of the cleaner portion 50 for different applications. The slot 23 of the frame portion 20 and the slot 53 of the cleaner attachment 50 should be aligned when the cleaner attachment 50 is positioned on the frame portion 20 as shown in the figures.

The slot 53 leads to a central opening 56 which is formed in the central portion of the cleaner attachment 50 as shown in FIG. 1. The central opening 56 may be comprised of a circular-shaped opening 56 as shown in FIG. 1, or it may be comprised of other configurations. The central opening 56 of the cleaner attachment 50 will preferably be smaller than the central opening 26 of the frame portion 20, though other configuration may be utilized for different embodiments. Further, the central opening 56 should have a slightly smaller diameter than that of the plumbob 14 being cleaned so as to ensure squeegee action as the plumbob 14 is passed therethrough.

The cleaner attachment 50 will preferably include one or more fastening apertures 58 positioned around its outer perimeter as shown in FIG. 1. Preferably, fastening apertures 58 will be positioned on the front end 51, rear end 52, first side 54 and second side 55 of the cleaner attachment 50 to ensure that the frame portion 20 may be firmly secured to the cleaner attachment 50 when the present invention is in use.

Each of the fastening apertures 58 is preferably comprised of an aperture extending through the cleaner attachment 50 which is adapted to receive and engage with a fastener 12 such as a rivet. The numbering and positioning of the fastening apertures 58 should not be construed as being limited by the exemplary figures. As appreciated by one skilled in the art, such positioning and numbering may vary for different embodiments of the present invention. Each of the fastening apertures 58 of the cleaner attachment 50 should be aligned with the fastening apertures 28 of the frame portion 20 when the cleaner attachment 50 is secured thereto.

It should be appreciated that the cleaner attachment 50 of the present invention may be removably or fixedly attached to the frame portion 20 depending on the embodiment of the present invention. In other embodiments, the cleaner attachment 50 and frame portions 20 may be integrally formed of a unitary structure.

The cleaner attachment 50 may be comprised of various materials so long as they efficiently remove oily residue from a plumbob 14 or other device without being warped or damaged by repeated exposure to oil or causing structural damage to the plumbob 14. In a preferred embodiment, the cleaner attachment 50 will be comprised of a rubber matting material.

E. Operation of Preferred Embodiment.

Figure 7:
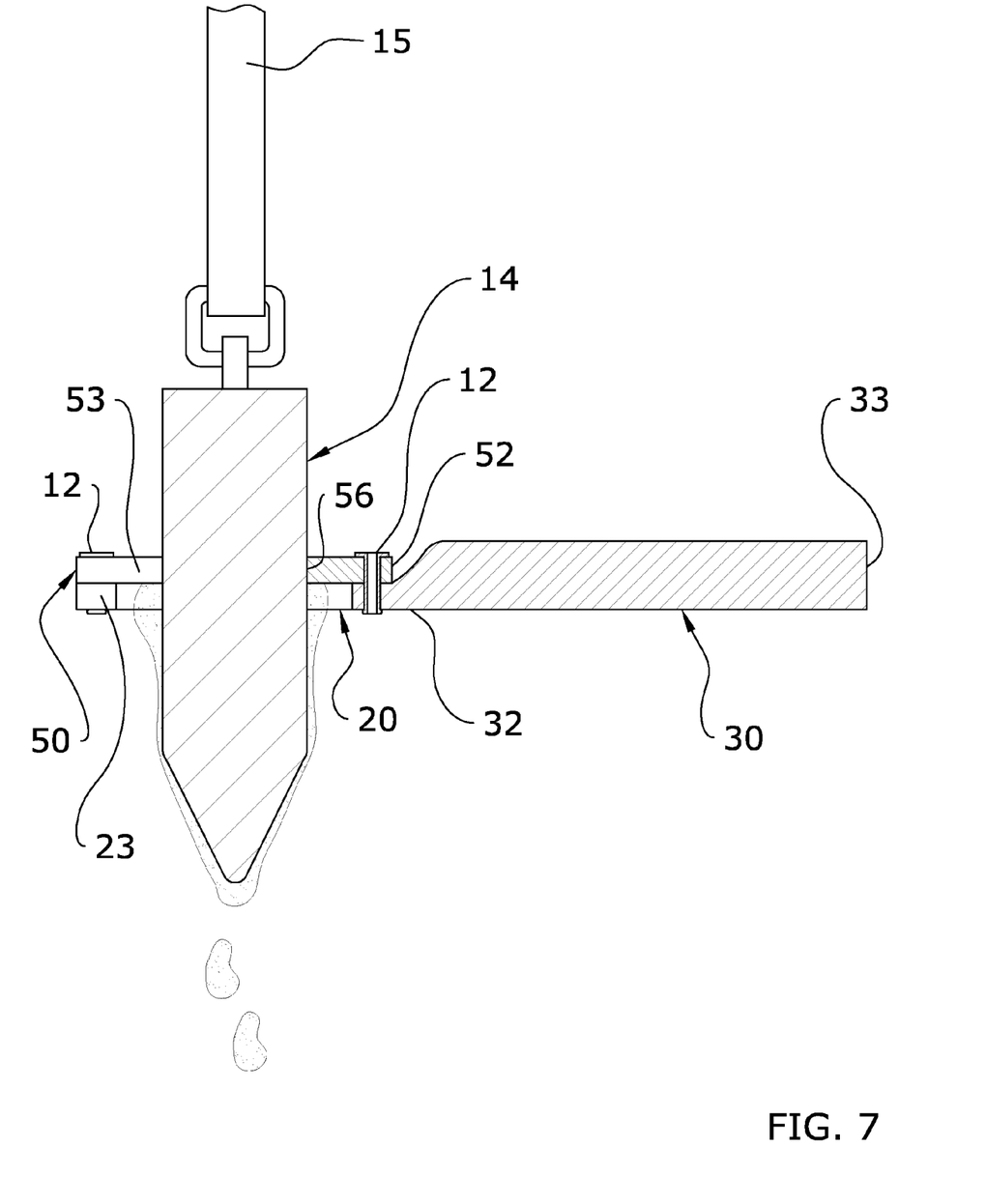
FIG. 7 is a side sectional view of the present invention in use.

In use, the gauge tape 15 of the plumbob 14 is first inserted through the slots 23, 53 of the frame portion 20 and cleaner attachment 50. The plumbob 14 is then drawn up through the central opening 56 of the cleaner attachment 50 to remove oily residue therefrom as shown in FIG. 7.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:
1. A handheld plumbob cleaner, comprising:
   a frame portion, wherein said frame portion includes a slot leading to a central opening;
   an elongated handle portion extending from said frame portion; and a cleaner attachment removably secured over said frame portion, wherein said cleaner attachment includes a slot leading to a central opening, wherein said slot of said frame portion is aligned with said slot of said handle portion, wherein said central opening is adapted to slidably receive and clean a plumbob.

2. The handheld plumbob cleaner of claim 1, wherein said cleaner attachment is removably secured to said frame portion by one or more fasteners.

3. The handheld plumbob cleaner of claim 2, wherein said one or more fasteners are comprised of rivets.

4. The handheld plumbob cleaner of claim 1, wherein said slot is positioned at a front end of said frame portion.

5. The handheld plumbob cleaner of claim 4, wherein said slot is positioned at a front end of said cleaner attachment.

6. The handheld plumbob cleaner of claim 1, wherein said cleaner attachment is comprised of a rubber material.

7. The handheld plumbob cleaner of claim 1, wherein said frame portion is comprised of a metal material.

8. The handheld plumbob cleaner of claim 1, wherein said central opening of said cleaner attachment is circular.

9. The handheld plumbob cleaner of claim 8, wherein said central opening of said frame portion is rectangular.

10. The handheld plumbob cleaner of claim 9, wherein said central opening of said cleaner attachment is comprised of a smaller width than that of said central opening of said frame portion.

11. A handheld plumbob cleaner, comprising:
a frame portion, wherein said frame portion includes a front end and a rear end;
a first slot extending from said front end of said frame portion;
a central opening extending through said frame portion, wherein said central opening is connected to said first slot;
a handle portion extending from said rear end of said frame portion;
a cleaner attachment removably secured over said frame portion, wherein said cleaner attachment includes a front end and a rear end;
a second slot extending from said front end of said cleaner attachment, wherein said second slot is aligned with said first slot when said cleaner attachment is secured to said frame portion; and
a second central opening extending through said cleaner attachment, wherein said second central opening is connected to said second slot, wherein said second central opening is adapted to slidably receive and clean a plumbob.

12. The handheld plumbob cleaner of claim 11, further comprising a plurality of fastener apertures positioned around an outer perimeter of said frame portion.

13. The handheld plumbob cleaner of claim 12, further comprising a plurality of fastener apertures positioned around an outer perimeter of said cleaner attachment.

14. The handheld plumbob cleaner of claim 13, further comprising a plurality of fasteners for securing said cleaner attachment to said frame portion.

15. The handheld plumbob cleaner of claim 14, wherein each of said plurality of fasteners is comprised of a rivet.

16. The handheld plumbob cleaner of claim 11, wherein said central opening of said cleaner attachment is comprised of a smaller width than that of said central opening of said frame portion.

17. The handheld plumbob cleaner of claim 11, wherein said cleaner attachment is comprised of a rubber material.

18. A handheld plumbob cleaner, comprising:
a frame portion, wherein said frame portion includes a front end and a rear end;
a first slot extending from said front end of said frame portion;
a central opening extending through said frame portion, wherein said central opening is connected to said first slot;
a plurality of fastener apertures positioned around an outer perimeter of said frame portion;
a handle portion extending from said rear end of said frame portion;
a cleaner attachment removably secured over said frame portion, wherein said cleaner attachment includes a front end and a rear end, wherein said cleaner attachment is comprised of a rubber material;
a second slot extending from said front end of said cleaner attachment, wherein said second slot is aligned with said first slot when said cleaner attachment is secured to said frame portion;
a plurality of fastener apertures positioned around an outer perimeter of said cleaner attachment;
a plurality of rivets for securing said cleaner attachment to said frame portion; and
a second central opening extending through said cleaner attachment, wherein said second central opening is connected to said second slot, wherein said second central opening is adapted to slidably receive and clean a plumbob.

* * * * *